United States Patent [19]
Fujimoto et al.

[11] Patent Number: 6,035,074
[45] Date of Patent: Mar. 7, 2000

[54] IMAGE PROCESSING APPARATUS AND STORAGE MEDIUM THEREFOR

[75] Inventors: Hiroyuki Fujimoto; Shuzo Kugimiya, both of Nara, Japan

[73] Assignee: Sharp Kabushiki Kaisha, Osaka, Japan

[21] Appl. No.: 09/021,019

[22] Filed: Feb. 9, 1998

[30] Foreign Application Priority Data

May 27, 1997 [JP] Japan ................................. 9-137164

[51] Int. Cl.⁷ ...................................................... G06K 9/20
[52] U.S. Cl. ............................................ 382/282; 382/118
[58] Field of Search .................................. 382/282, 115, 382/117, 118

[56] References Cited

U.S. PATENT DOCUMENTS

| | | | |
|---|---|---|---|
| 5,629,752 | 5/1997 | Kinjo | 382/118 |
| 5,642,160 | 6/1997 | Bennett | 382/118 |
| 5,781,665 | 7/1998 | Cullen et al. | 382/282 |
| 5,850,463 | 12/1998 | Horii | 382/118 |
| 5,850,470 | 12/1998 | Kung et al. | 382/118 |

FOREIGN PATENT DOCUMENTS

A-7303250  11/1995  Japan .

Primary Examiner—Yon J. Couso

[57] ABSTRACT

An image processing apparatus includes an image acquiring section for acquiring a color image including a human object image, a display section for displaying the acquired color image, a recognition color memory preliminarily storing therein a plurality of face recognition color data for recognition of a face image of the human object image in the color image, a recognition designating section for designating implementation of a face image recognizing operation, a face image recognizing section for comparing color data in the entire color image with the plurality of face recognition color data in response to the designation of the recognition designating section, and recognizing an area having color data conforming to any of the face recognition color data as a face image area, an area designating section for designating the recognized face image area as a face image pickup area, a frame forming section for forming a frame having a size such that the face image pickup area can be embraced in the frame in response to the designation of the area designating section, and a face image cutting section for cutting out an area enclosed in the frame.

22 Claims, 18 Drawing Sheets

IMAGE PROCESSING APPARATUS AND STORAGE MEDIUM THEREFOR

CROSS-REFERENCE TO RELATED APPLICATION

This application is related to Japanese application No. Hei 9(1997)-137164, filed on May 27, 1997, whose priority is claimed under 35 USC §119, the disclosure of which is incorporated by reference in its entirety.

BACKGROUND OF THE INVENTION

1. Field of the Invention

The present invention relates to an image processing apparatus and a storage medium containing a program for controlling the image processing apparatus. More particularly, the invention relates to an image processing apparatus and a storage medium containing a program for controlling the image processing apparatus, which are adapted to automatically recognize and cut a face image of a human object out of a digital photograph (digital image data).

2. Description of the Prior Art

Since higher performance personal computers, scanners and digital cameras have been in widespread use in recent years, not only corporate users in printing offices, and phototypesetting offices but also personal users increasingly have opportunities to deal with digital photographs. The users typically use photoretouching software on a personal computer to correct blemishes and hues of digital photographs.

With the use of photoretouching software, an object image portion can be cut out of one image and pasted on another image. For example, a human object image can be cut out of a digital photograph containing a human object and pasted on a scene in another digital photograph. Thus, a composite digital photograph can be produced which contains the human object as if it was present in the scene. This technique can also be applied to production of digital ID photographs. However, the image processing operation for cutting only a human object image out of a digital photograph is manually performed, thereby requiring considerable time and labor.

As prior art image processing for ID photographs, Japanese Unexamined Patent Publication No. HEI 7(1995)-303250, for example, proposes an apparatus for taking an ID photograph, which is adapted to take a photograph of a human object after the size of a human object image is properly adjusted with respect to the size of the photograph by comparing the size of a human object area with the size of a photographing area.

According to Japanese Unexamined Patent Publication No. 7(1995)-303250, however, no consideration is given to the cut-out of a human object image, since the apparatus is designed specifically for ID photographs. Therefore, the apparatus cannot adjust the size of a human object image cut out of a background image (such as a building, for example) nor extract a particular human object from an image containing a plurality of human objects. Further, the apparatus is not designed to deal with a finished photograph.

SUMMARY OF THE INVENTION

In view of the foregoing, the present invention provides an image processing apparatus and a storage medium which contains a program for controlling the image processing apparatus. The apparatus and the program are adapted to perform the functions of: acquiring color image data from a digital image currently being picked up or an image in a finished photograph containing a human object image without any influences of the background and brightness of the image; automatically recognizing a face image of the human object in the color image data; and cutting out an area in accordance with the size of the face image.

In accordance with a preferred embodiment the present invention, there is provided an image processing apparatus which comprises: an image acquiring section for acquiring a color image including a human object image; a display section for displaying the acquired color image and the like; a recognition color memory preliminarily storing therein a plurality of face recognition color data for recognition of a face image of the human object image in the color image; a recognition designating section for designating implementation of a face image recognizing operation and the like; a face image recognizing section for comparing color data in the entire color image with the plurality of face recognition color data in response to the designation of the recognition designating section, and recognizing an area having color data conforming to any of the face recognition color data as a face image area; an area designating section for designating the recognized face image area as a face image pickup area; a frame forming section for forming a frame having a size such that the face image pickup area can be embraced in the frame in response to the designation of the area designating section; and a face image cutting section for cutting out an area enclosed in the frame.

DETAILED DESCRIPTION OF THE PREFERRED EMBODIMENTS

Figure 1:
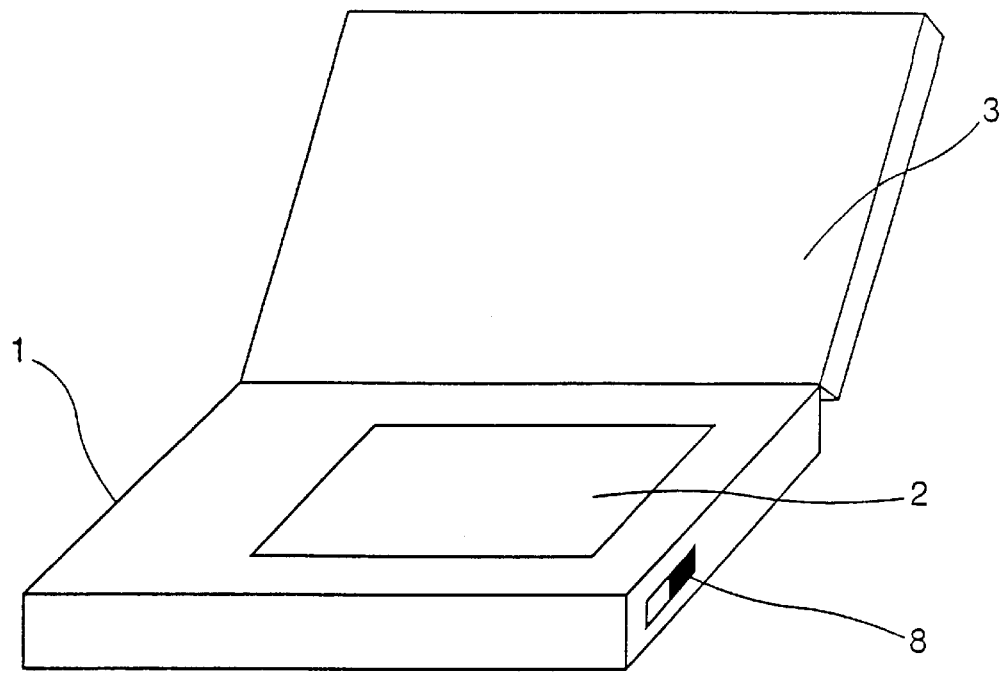
FIG. 1 is perspective view illustrating the appearance of a photographic image processing apparatus according to the present invention.

The image processing apparatus according to the present invention comprises: an image acquiring section for acquiring a color image including a human object image; a display section for displaying the acquired color image and the like; a recognition color memory preliminarily storing therein a plurality of face recognition color data for recognition of a face image of the human object image in the color image; a designating section for designating implementation of a face image recognizing operation and the like; a face image recognizing section for comparing color data in the entire color image with the plurality of face recognition color data in response to the designation of the implementation of the face image recognizing operation, and recognizing an area having color data conforming to any of the face recognition color data as a face image area; an area designating section for designating the recognized face image area as a face image pickup area; a frame forming section for forming a frame having a size such that the face image pickup area can be embraced in the frame in response to the designation of the face image pickup area; and a face image cutting section for cutting out an area enclosed in the frame.

In the present invention, the display section comprises a liquid crystal circuit and an LCD display. The image acquiring section, the recognition color memory, the face image recognizing section, the frame forming section and the face image cutting section are comprised of a microprocessor including a CPU, a ROM, a RAM and I/O ports.

The recognition color memory is comprised of the ROM and the RAM, and stores a plurality of face recognition color data preliminarily selected and a plurality of spare face recognition color data replaceable with the preliminarily selected face recognition color data in its memory areas.

The image acquiring section is connected to an image inputting device such as a digital camera (CCD camera) for picking up a color image and inputting the picked-up color image directly to the image acquiring section, a scanner for picking up a color image from a photograph or a modem for receiving color image data from the Internet and to an image memory for storing therein image data via control lines.

The recognition designating section and the area designating section are comprised of a pen and a transparent tablet integrally formed on the display, and the functions thereof are preferably displayed as designation icons in a peripheral portion of the display.

In accordance with the present invention, color image data including a human object image is acquired from a digital image currently being picked up or an image in a finished photograph without any influences of the background or brightness of the image; a face image of the human object image is automatically recognized in the color image data; and an area including the recognized face image is cut out in accordance with the size of the face image.

The face image recognizing section is preferably designed such that, when a plurality of areas having color data conforming to any of the face recognition color data are recognized in the color image, an area having the greatest size is extracted as the face image area from the plurality of areas thus recognized.

With this arrangement, a face image of one human object can be recognized in an image including a plurality of human objects and cut out. Therefore, an ID photograph can be made without taking a photograph of the single human object.

The image processing apparatus preferably further includes a recognition color changing section for changing the face recognition color data to be stored as face recognition colors in the face recognition color memory when the plurality of face recognition color data stored in the recognition color memory are displayed for selection on the display section and any of the face recognition color data is selected, and outputting the changed face recognition color data to the face image recognizing section.

With this arrangement, the face recognition color data to be stored as recognition colors in the face recognition color memory can be changed in accordance with the face skin color of the human object which may differ from person to person and the brightness of a photographing site.

The face image recognizing section is preferably adapted to compare the color data in the entire color image with the face recognition color data changed by the recognition color changing section upon receiving the changed face recognition color data, and recognize an area having color data conforming to any of the changed face recognition color data as a face image area.

With this arrangement, the face image can be recognized by using face recognition color data selected in accordance with the face skin color of the human object which may differ from person to person and the brightness of the photographing site.

It is preferred that the area designating section further has the function of outputting changes in the position and size of the formed frame to the frame forming section, and that the frame forming section is adapted to reform the frame in accordance with the position and size of the frame designated by the area designating section.

With this arrangement, the recognized face image area can be cut out in accordance with the changes in the position and size of the frame.

The face image recognizing section is preferably adapted to display the recognized face image area on the display section in reverse on a complementary color basis.

With this arrangement, the face image area automatically recognized in the acquired image can easily be confirmed.

The functions of the recognition designating section and the area designating section are preferably displayed in an icon form on the display section.

With this arrangement, the particular face image area can be cut out of the acquired image by operating the icons with the pen or a finger while viewing the display section.

The present invention will hereinafter be described in detail by way of an embodiment thereof with reference to the attached drawings. It should be understood that the invention be not limited to the embodiment.

FIG. 1 is a perspective view illustrating the appearance of an image processing apparatus according to the present invention. In FIG. 1, there are shown a main body cabinet 1, an input-output section 2, a cover 3 and a main body power source switch 8. The image processing apparatus is comprised of the main body cabinet 1 and the cover 3. The input-output section 2 is provided on the top face of the main body cabinet 1, and has a display section and a transparent tablet integrally formed on the display section. An infrared communication section (not shown), a pen holding section (not shown) and the like are also provided on the top face of the main body cabinet 1. The main body cabinet 1 incorporates therein a control section for controlling the input-output section 2, the infrared communication section, an interface and the like, and a power source for applying voltages to the respective components.

The cover 3 is pivotally connected to an edge of the main body cabinet 1 by a hinge, so that the input-output section 2 is covered therewith to be protected during transportation of the apparatus.

The main body power source switch 8 is provided on a side wall of the main body cabinet 1, and operated to turn on and off the voltage application from the power source.

Figure 2:
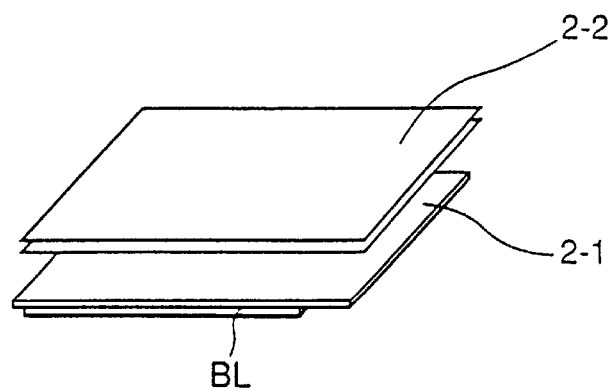
FIG. 2 is a perspective view illustrating the construction of an input-output section of the apparatus shown in FIG. 1.

FIG. 2 is a perspective view illustrating the appearance of the input-output section shown in FIG. 1. As shown in FIG. 2, the input-output section 2 includes a thin color liquid crystal display section 2-1 of a matrix type capable of displaying character information and image information in a dot form and a transparent tablet 2-2 formed integrally on the color liquid crystal display section 2-1 and having a size large enough to cover the color liquid crystal display section 2-1.

As required, a back light BL (such as an EL panel) may be provided on the rear face of the color liquid crystal display section 2-1.

The transparent tablet 2-2 comprises a pair of transparent sheets, transparent electrodes formed on the interior surfaces of the transparent sheets for defining XY coordinates, and spacers of small projections regularly printed on the interior surfaces of the transparent sheets for preventing the respective electrodes from coming in contact with each other under normal conditions. When the transparent tablet 2-2 is touched with a finger or a pen, the transparent electrodes in the touched portion of the transparent tablet 2-2 are brought in contact with each other so that information indicative of the position of the touched portion can be obtained. Further, display information designated by a user on the color liquid crystal display section 2-1 can be detected by synchronizing the display information displayed on the color liquid crystal display section 2-1 with the positional information.

Figure 3:
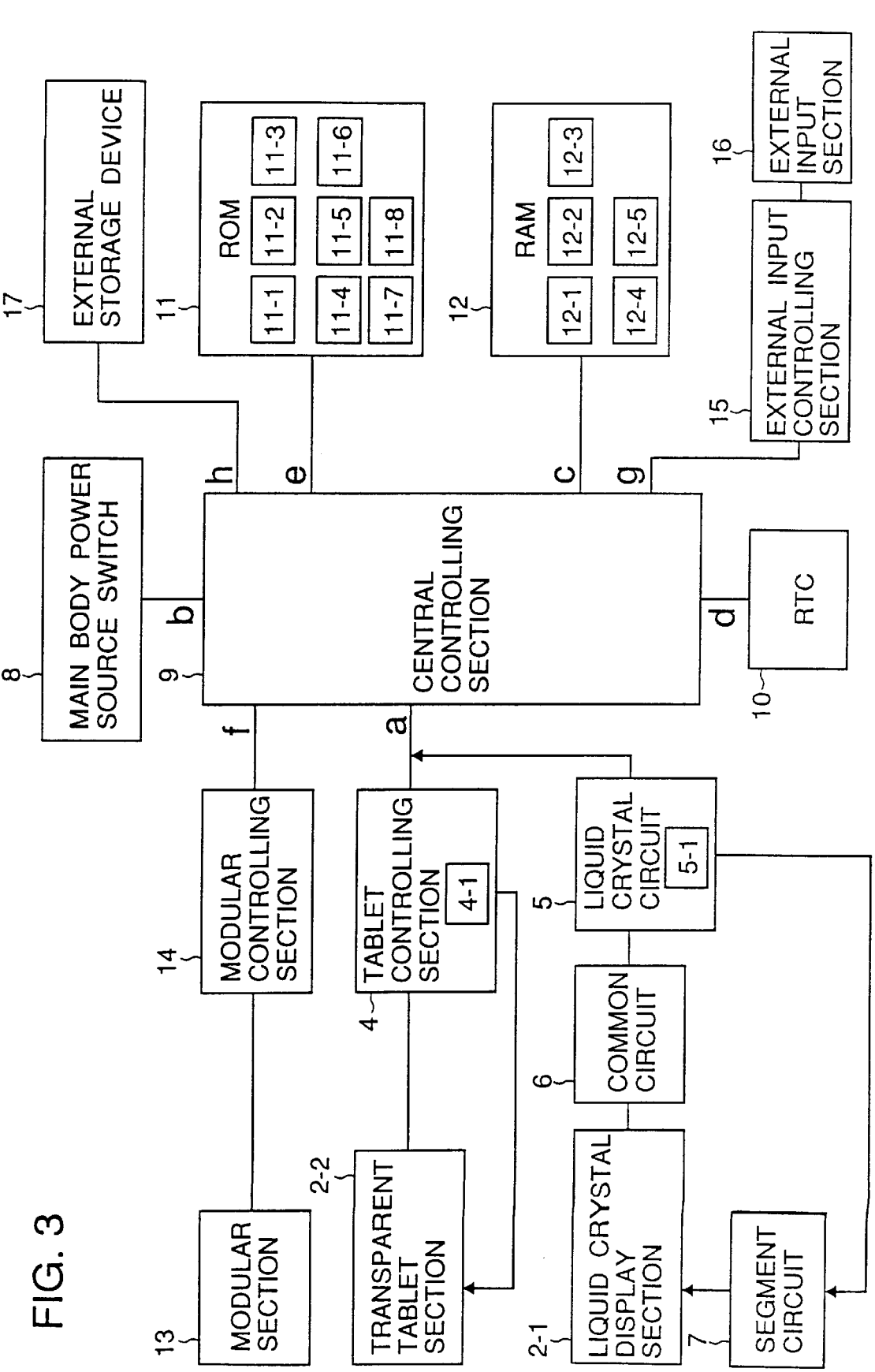
FIG. 3 is a block diagram illustrating the overall construction of the image processing apparatus according to the present invention.

FIG. 3 is a block diagram illustrating the overall construction of the image processing apparatus according to the present invention. As shown in FIG. 3, the apparatus of the present invention includes the color liquid crystal display section 2-1, the transparent tablet 2-2, a tablet controlling section 4, a liquid crystal circuit 5, a common circuit 6, a segment circuit 7, the main body power source switch 8, a central controlling section 9, an RTC 10, a ROM 11, a RAM 12, a modular section 13, a modular controlling section 14, an external input controlling section 15, an external input section 16 and an external storage device 17.

The modular section 13 and the modular controlling section 14 function as a communication interface to be connected to a communication network. The external input controlling section 15 and the external input section 16 function as an image interface to be connected to a digital camera (CCD camera) and a scanner.

The tablet controlling section 4 scans the transparent electrodes of the transparent tablet 2-2 while synchronizing the display information displayed on the color liquid crystal display section 2-1 with the positional information to determine coordinates indicative of the position of a portion of the transparent tablet 2-2 touched with a finger or a pen where transparent electrodes are brought in contact with each other.

The liquid crystal circuit 5 stores dot positions to be activated on the liquid crystal display section as a bit map in a display memory, and sends driving signals corresponding to display information to the common circuit 6 and the segment circuit 7 to drive the color liquid crystal display section 2-1.

The central controlling section 9 is comprised of a microprocessor including an CPU and I/O ports. The CPU is connected to the tablet controlling section 4 via a control line a, to the main body power source switch 8 via a control line b, to the RAM 12 via a control line C, to the RTC 10 via a control line d, to the ROM 11 via a control line e, to the modular controlling section 14 via a control line f, to the external input controlling device 15 via a control line g, and to the external storage device 17 via a control line h, and controls input information and output information of the respective components in accordance with program commands from the ROM 11.

The RTC (real time clock) 10 clocks the real time by utilizing clock signals (not shown), and outputs information regarding the current time, date, month and year to the central controlling section 9.

The ROM 11 has program areas storing therein programs for causing the central controlling section 9 to control the respective components. More specifically, the program areas respectively store therein programs which perform functions as a face image recognizing section 11-1, a face image selecting section 11-2, an area designating section 11-3, a face image cutting section 11-4, a recognition color changing section 11-5, an image acquiring section 11-6, a frame forming section 11-7, and a coordinate computing section 11-8.

The RAM 12 includes memory areas which respectively function as an image buffer memory 12-1, a recognition color memory 12-2, a clip board memory 12-3, an image memory 12-4, and a recognition result memory 12-5.

In accordance with the present invention, the image processing apparatus shown in FIG. 3 may be controlled by a computer program which is stored in a storage medium, e.g., a memory card such as of an EEPROM, a floppy disk, a hard disk, an MD or a CD-ROM, and used as a general purpose program in the external storage device. The storage medium according to the present invention contains therein the computer program for controlling the image processing apparatus having the color liquid crystal display section 2-1, the recognition color memory 12-2 preliminarily storing therein a plurality of face recognition color data for recognition of a face image of a human object image in a color image, a recognition designating section for designating implementation of a face image recognizing operation and the like, and an area designating section for designating a face image pickup area, the computer program causing the computer to perform the functions of: acquiring a color image including a human object image; displaying the acquired color image and the like on the color liquid crystal display section 2-1; comparing color data in the entire color image with the plurality of face recognition color data in response to designation of the implementation of the face image recognizing operation by the recognition designating section, and recognizing an area having color data conforming to any of the face recognition color data as a face image area; forming a frame having a size such that the face image area can be embraced in the frame in response to designation of a face image pickup area by the area designating section; and cutting out an area including the face image pickup area and enclosed in the frame.

In the above-described construction, the recognition designating section and the area designating section may be included on the transparent tablet 2-2 and the color liquid crystal display section 2-1, on which the functions are displayed in icon form. The central controlling section 9 may obtain the control program from the external storage device 17 via the control line h.

Figure 4:
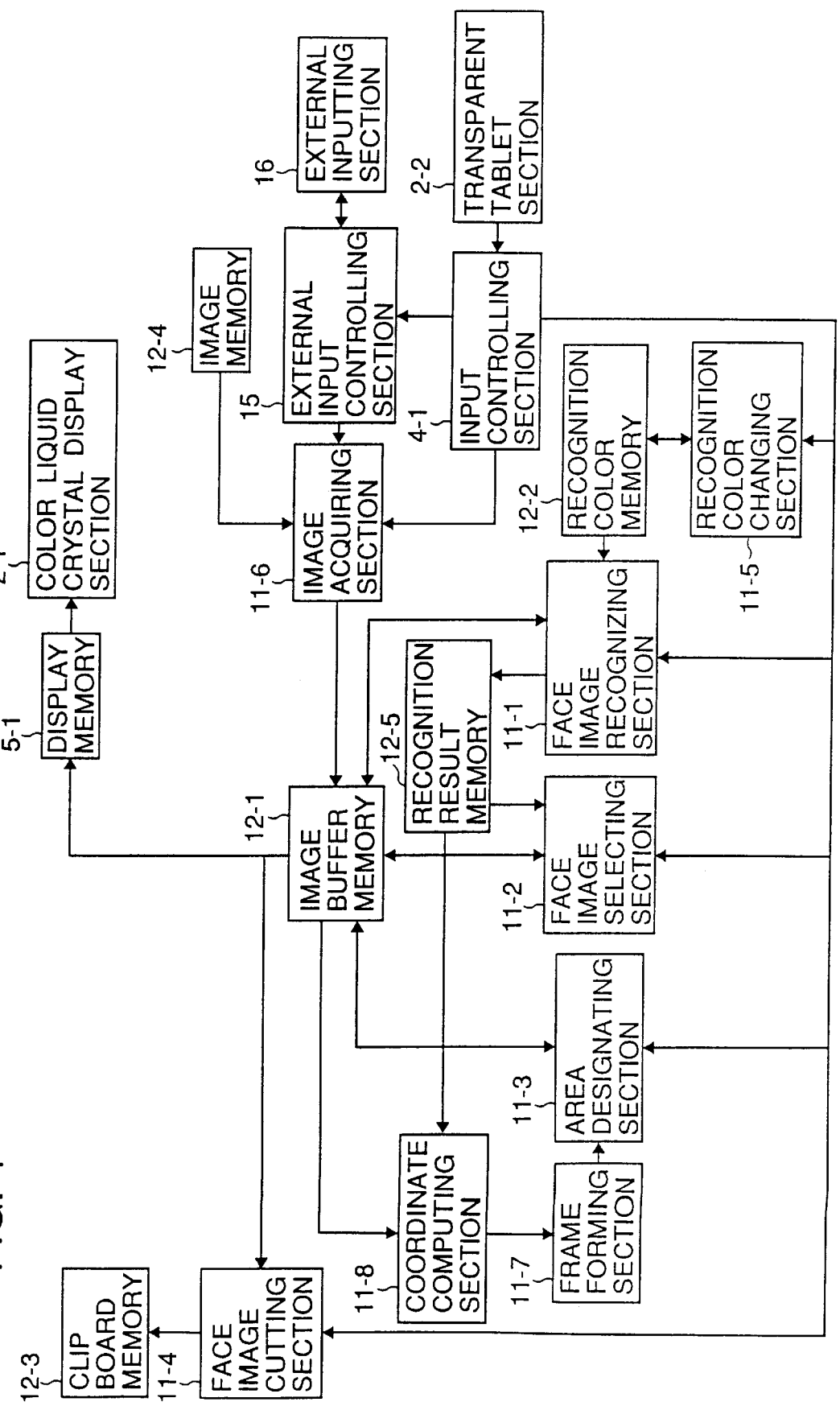
FIG. 4 is a block diagram illustrating the construction of the image processing apparatus of FIG. 3 on a function basis.

FIG. 4 is a block diagram illustrating the construction of the image processing apparatus of FIG. 3 on a function basis. Referring to FIG. 4, an input controlling section 4-1 reads coordinates indicative of the position of a portion of the transparent tablet 2-2 touched with the pen. The external input controlling section 15 controls the scanner, the digital camera and the like connected to the external input section 16 to acquire image data.

The image acquiring section 11-6 acquires image data currently being picked up by the image pickup device (the scanner, the digital camera or the like) and inputted from the external input section 16 connected to the image pickup device, or image data from the image memory 12-4 which stores therein image data previously picked up.

The image buffer memory 12-1 stores therein the acquired image data.

A display memory 5-1 stores therein image data to be displayed on the color liquid crystal display section 2-1.

The recognition color memory 12-2 stores therein a plurality of face recognition colors which have tints close to the skin color of the face image to be recognized.

The face image recognizing section 11-1 compares the image data stored in the image buffer memory 12-1 with the plurality of face recognition color data stored in the recognition color memory 12-2 for color matching, and recognizes a portion of the image data having a color conforming to any of the plurality of face recognition color data as a face image area. The coordinate computing section 11-8 calculates the area of the recognized face image area and stores the area and coordinates of the recognized face image area in the recognition result memory 12-5.

The recognition color changing section 11-5 stores selected face recognition color data in the recognition color memory 12-2. The area designating section 11-3 performs an area designating operation for picking up the recognized face image area. The coordinate computing section 11-8 performs a calculation on the basis of the coordinates of the recognized face image area to determine a rectangular frame which embraces the recognized face image area. The frame forming section 11-7 forms the rectangular frame determined by the coordinate computing section 11-8. The rectangular frame is superimposed on the image data in the image buffer memory 12-1 and displayed on the color liquid crystal display section. The face image cutting section 11-4 extracts image data corresponding to the face image pickup area from the image buffer memory 12-1, and the image data thus extracted are stored in the clip board memory 12-3.

Figure 18:
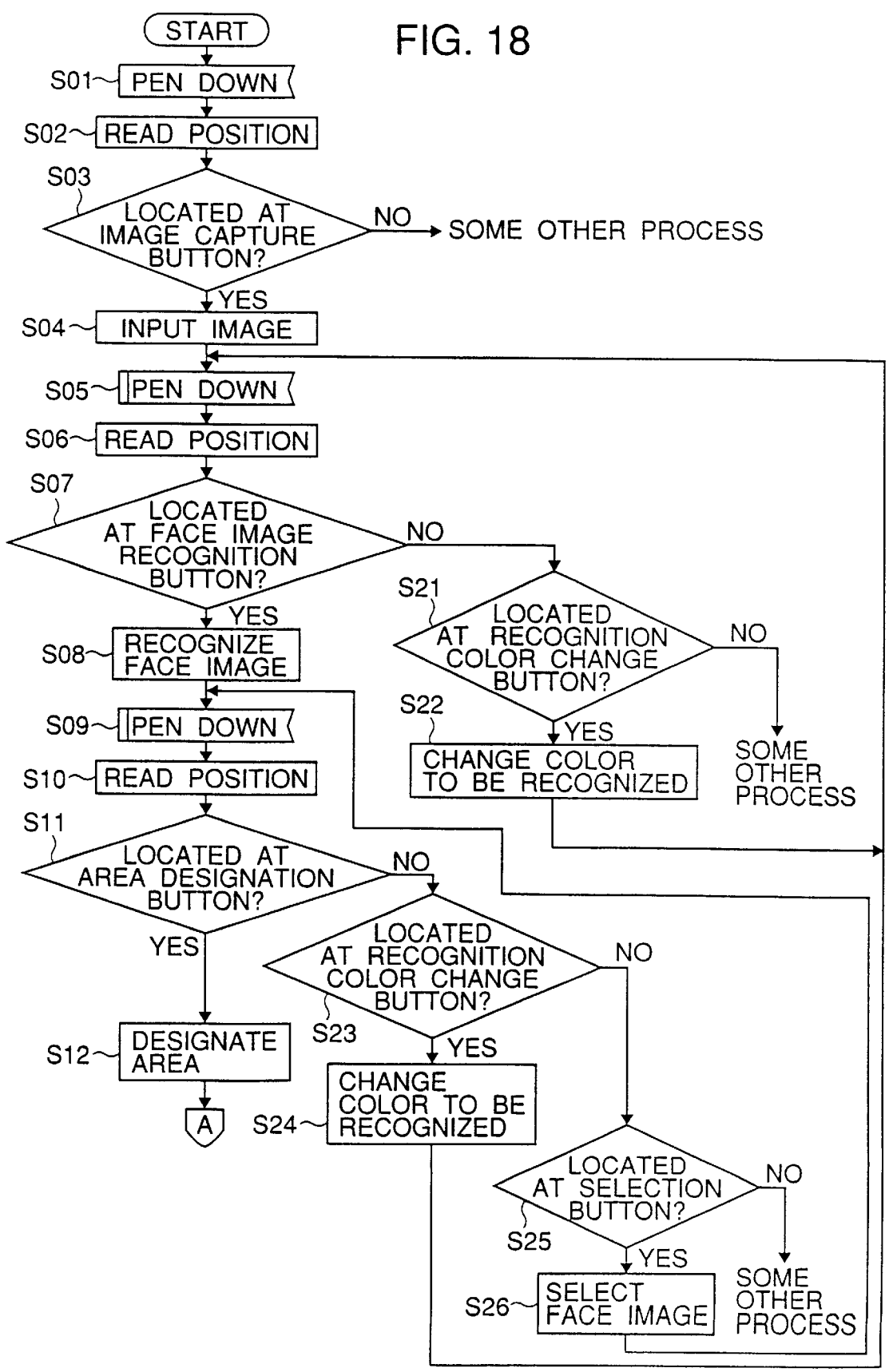
FIG. 18 is a flow chart of an image processing operation according to the embodiment.
Figure 19:
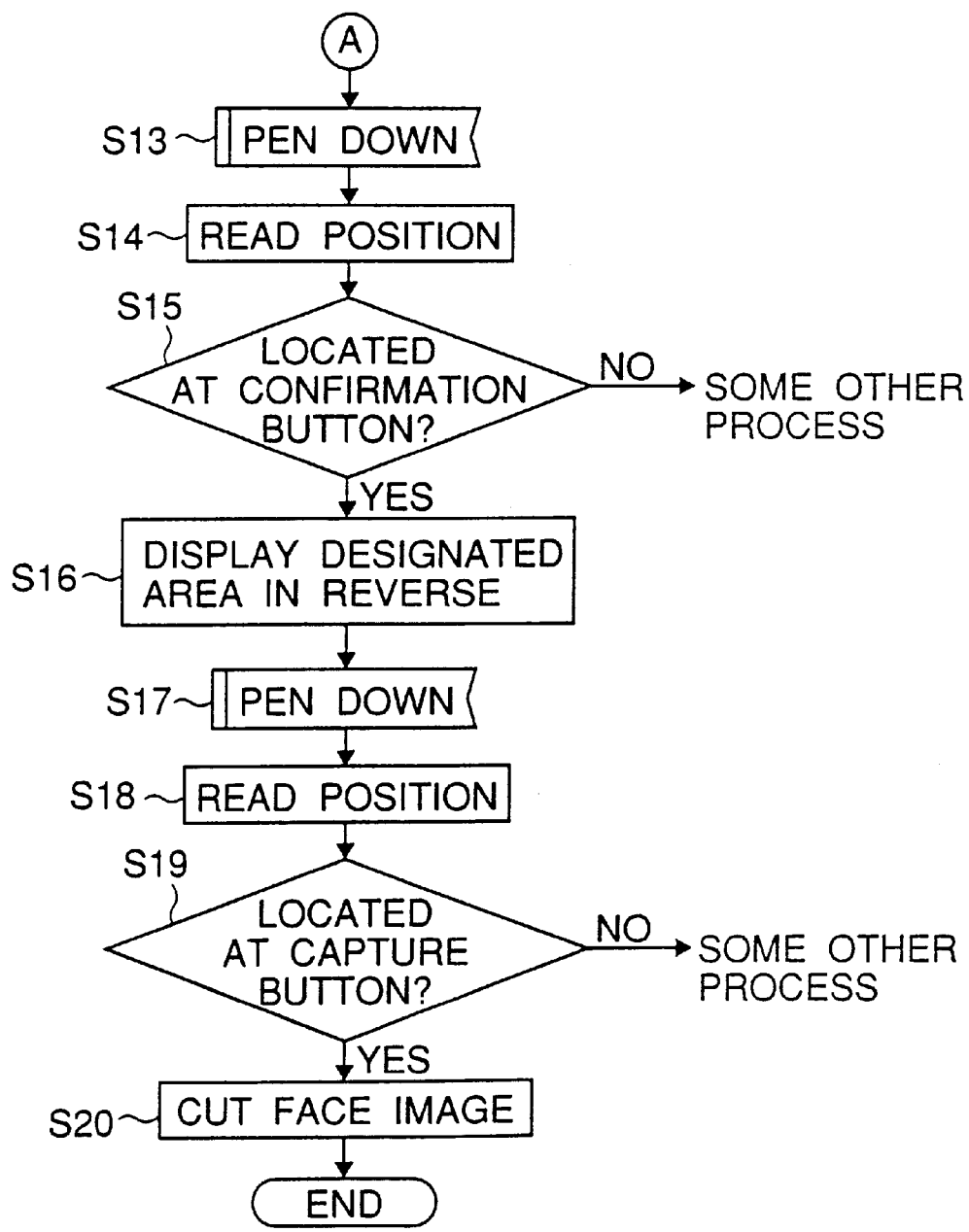
FIG. 19 is a continuation of the flow chart of the image processing operation shown in FIG. 18.

FIGS. 5 to 17 are explanatory diagrams illustrating exemplary display screens for the image processing operation according to this embodiment. A current time "DEC. 27, FRI., 1996. 10:10 AM", for example, inputted from the RTC 10 is displayed on the display screen. FIGS. 18 and 19 are flow charts of the image processing operation according to this embodiment. The image processing operation shown in FIGS. 18 and 19 will hereinafter be described with reference to FIGS. 5 to 17.

Figure 5:
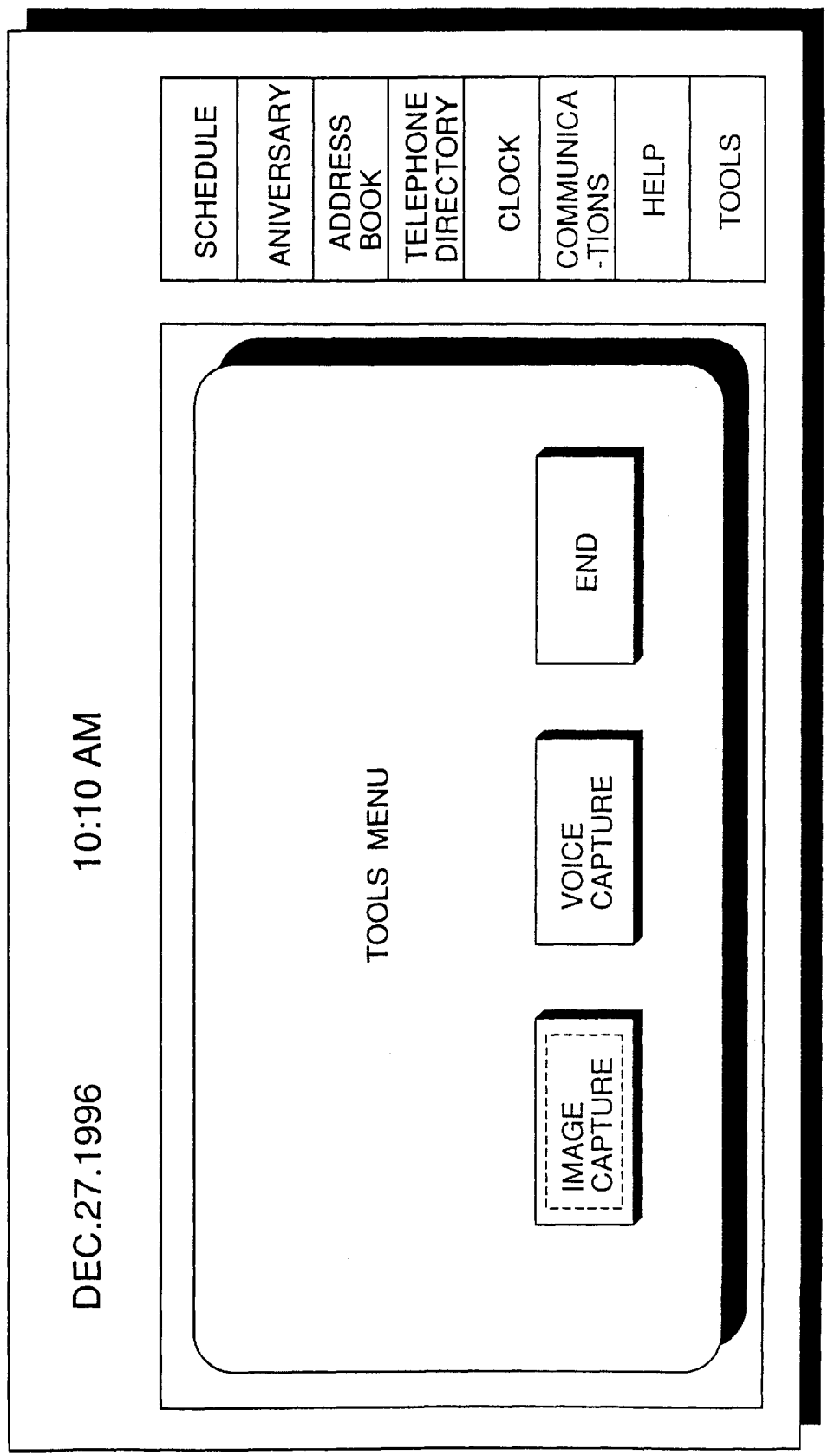
FIG. 5 is an explanatory diagram illustrating a "TOOLS MENU" display screen in accordance with one embodiment of the present invention.

FIG. 5 is an explanatory diagram illustrating a "TOOLS MENU" screen in accordance with one embodiment of the present invention. When the main body power source switch 8 is turned on and an icon button "TOOLS" is selected on an initial screen, the "TOOLS MENU" screen for designating an "IMAGE CAPTURE" or "VOICE CAPTURE" operation is displayed as shown in FIG. 5.

Step S01: When a user touches the color liquid crystal display section 2-1 with the pen with the "TOOLS MENU" screen displayed thereon, interruption is accepted by the transparent tablet 2-2.

Step S02: Coordinates indicative of the position of a portion of the transparent tablet 2-2 touched with the pen is read into the input controlling section 4-1.

Step S03: The coordinates read in Step S02 are checked and, if the coordinates correspond to the position of the "IMAGE CAPTURE" button (indicated by a dashed line in FIG. 5), the process goes to Step S04. If the coordinates correspond to any other buttons, some other process is performed.

Step S04: A color image data (color photographic data) acquiring operation and a displaying operation are performed. More specifically, under control of the external input controlling section 15, the image acquiring section 11-6 acquires color image data currently being picked up by the image inputting device (the scanner, the digital camera or the like) and inputted from the external input section 16 connected to the image inputting device, or color image data of a photograph stored in the image memory 12-4. The color image data thus acquired are stored in the image buffer memory 12-1 and, at the same time, sent to the display memory 5-1 so as to be displayed on the color liquid crystal display section 2-1.

Figure 6:
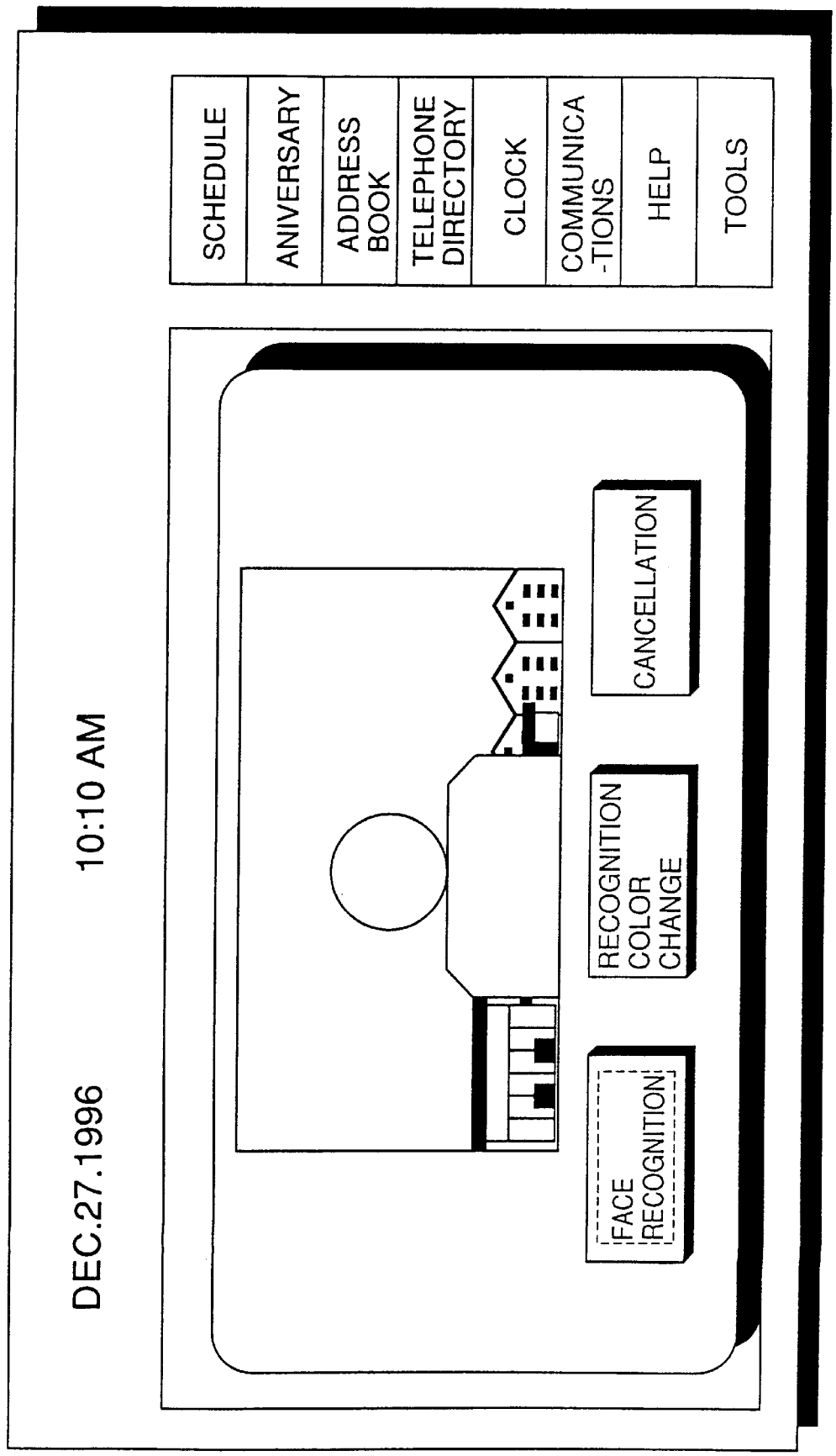
FIG. 6 is an explanatory diagram illustrating a display screen for an image acquiring operation according to the embodiment.

FIG. 6 is an explanatory diagram illustrating a display screen for the image acquiring operation according to this embodiment. As shown in FIG. 6, when the color image data are displayed on the display screen after the acquisition thereof, the user checks if the displayed color image data is an object image to be recognized and, if so, designates the implementation of a face image recognizing operation.

Step S05: When the user touches any of the buttons on the display screen with the pen after checking an image acquiring operation screen, interruption is accepted by the transparent tablet 2-2.

Step S06: Coordinates indicative of the position of a portion of the transparent tablet 2-2 touched with the pen are read into the input controlling section 4-1.

Step S07: The coordinates read in Step S06 are checked and, if the coordinates correspond to the position of a "FACE RECOGNITION" button (indicated by a dashed line in FIG. 6), the face image recognizing section 11-1 is activated, and the process goes to Step S08. If the coordinates correspond to any other buttons, the process goes to Step S21.

Step S08: The face image recognizing section 11-1 performs the face image recognizing operation. More specifically, the face image recognizing section 11-1 compares the color image data stored in the image buffer memory 12-1 with the plurality of face recognition color data stored for recognition of a face image in the recognition color memory 12-2 for color matching, and recognizes color image portions in the color image data in the image buffer memory 12-1 that have a color conforming to any of the plurality of face recognition color data. At this time, the largest of the recognized color image portions is extracted as a face image area.

The recognition color memory 12-2 stores a plurality of face recognition colors which have tints close to the skin color of the face image to be recognized. As described above, a color image portion having a color conforming to any of these face recognition colors is recognized as the face image area. The face image recognizing section 11-1 calculates the area of the recognized face image area, and stores the area and coordinates of the recognizes face image area in the recognition result memory 12-5. Further, the face image data in the recognized face image area is subjected to a complementary color data converting process in display memory 5-1, and then displayed in reverse on color liquid crystal display section 2-1 (see FIG. 7).

Figure 7:
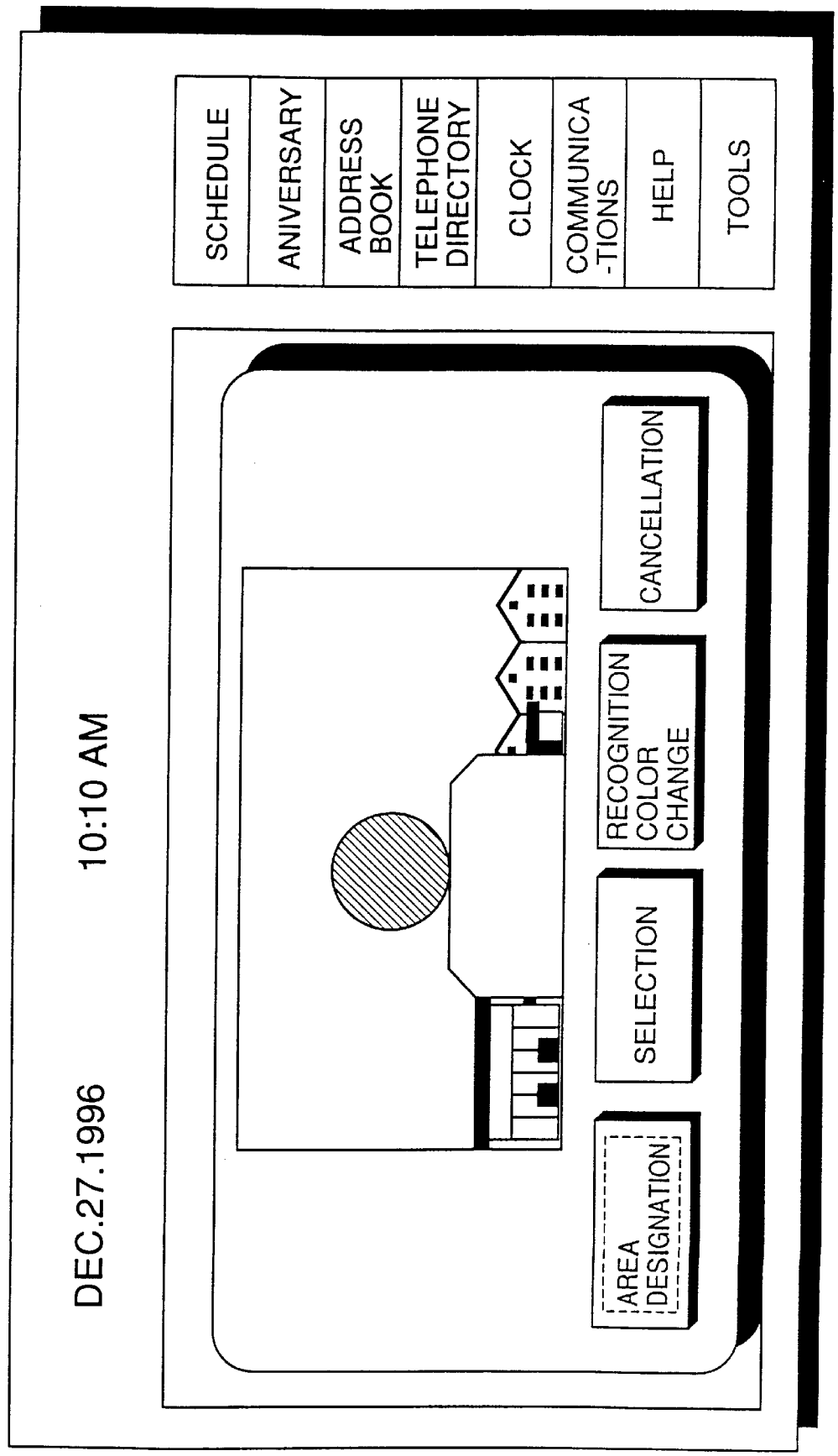
FIG. 7 is an explanatory diagram illustrating a display screen for a face image recognizing operation according to the embodiment.

FIG. 7 is an explanatory diagram illustrating a display screen for the face image recognizing operation according to this embodiment. In FIG. 7, the recognized face image area is displayed in reverse on a complementary color basis.

Step S09: The user checks the recognized face image area on the display screen after the face image recognizing operation. When the user touches any of the buttons on the display screen with the pen, interruption is accepted by the transparent tablet 2-2.

Step S10: Coordinates indicative of the position of a portion of the transparent tablet 2-2 are read into the input controlling section 4-1.

Step S11: The coordinates read in Step S10 are checked and, if the coordinates correspond to an "AREA DESIGNATION" button (indicated by a dashed line in FIG. 7), the area designating section 11-3 is activated, and the process goes to Step S12. If the coordinates correspond to any other buttons, the process goes to Step S23.

Step S12: The area designating section 11-3 performs the area designating operation for picking up the face image area recognized in Step S08. Then, a frame defining a face image cutting area is displayed on the display screen (see FIG. 8).

More specifically, the coordinate computing section 11-8 reads out the XY coordinates defining the face image pickup area from the image buffer memory 12-1 in response to the designation by the area designating section 11-3, and determines the maximum and minimum X coordinates (x1 and x2) of the face image pickup area, the maximum and minimum Y coordinates (y1 and y2) of the face image pickup area, coordinates (x1+N, y1+N) which are obtained by adding N to the maximum coordinates x1 and y1, and coordinates (x2−N, y2−N) which are obtained by subtracting N from the minimum coordinates x2 and y2.

The number N is a predetermined number which can be reset to adjust the size of the frame as required.

The frame forming section 11-7 forms a rectangular frame by linking the four points defined by the coordinates determined by the coordinate computing section 11-8, and the rectangular frame is superimposed on the image data in the image buffer memory 12-1 and displayed on the color liquid crystal display section.

Figure 8:
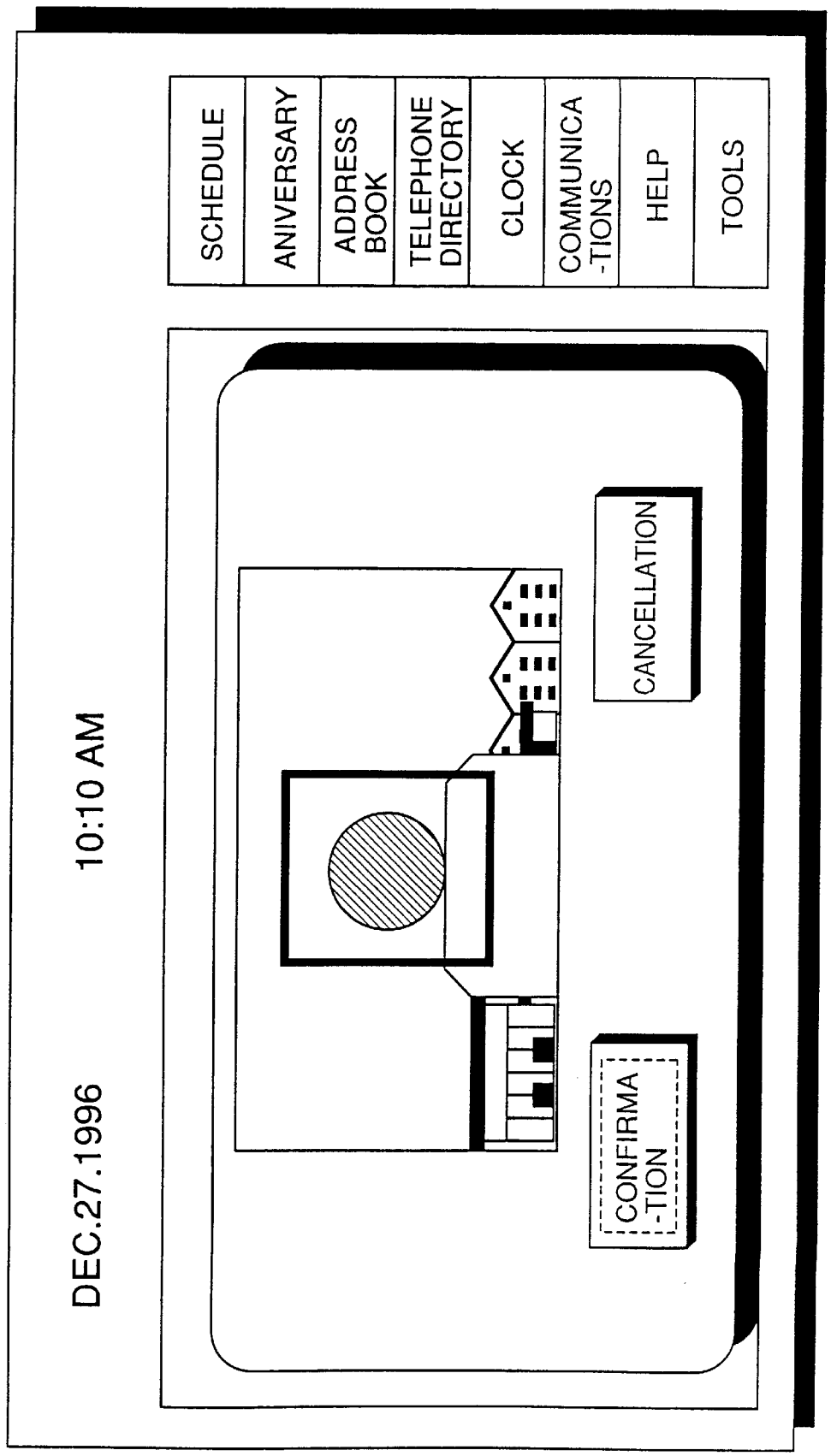
FIG. 8 is an explanatory diagram illustrating a display screen for a pickup area designating operation according to the embodiment.

FIG. 8 is an explanatory diagram illustrating a display screen for a pickup area designating operation according to this embodiment. As shown in FIG. 8, the frame defining the face image cutting area is displayed in superimposition on the image data on the display screen.

Figure 16:
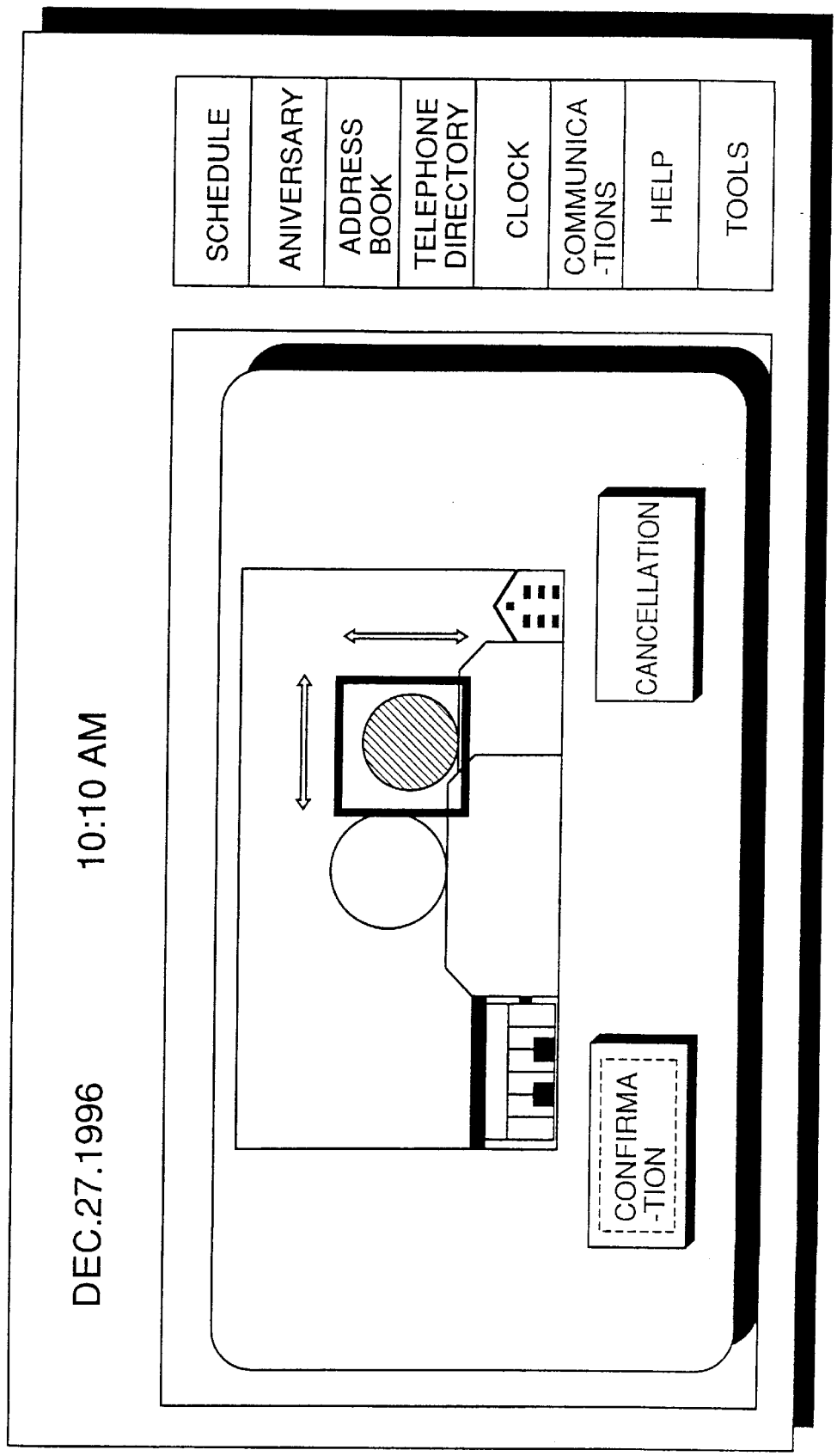
FIG. 16 is an explanatory diagram illustrating a display screen for a frame size changing operation according to the embodiment.

FIG. 16 is an explanatory diagram illustrating a display screen for a frame size changing operation according to this embodiment. As shown in FIG. 16, the frame defining the face image cutting area can optionally be scaled up or down or moved by dragging the frame with the pen.

Step S13: When the user touches any of the buttons on the display screen with the pen after checking the pickup area designating operation screen shown in FIG. 8, interruption is accepted by the transparent tablet 2-2.

Step S14: Coordinates indicative of the position of a portion of the transparent tablet 2-2 touched with the pen is read into the input controlling section 4-1.

Step S15: The coordinates read in Step S14 are checked and, if the coordinates correspond to a "CONFIRMATION" button (indicated by a dashed line in FIG. 8), the process goes to Step S16. If the coordinates correspond to any other buttons, some other process is performed.

Step S16: The face image cutting area determined in Step S12 is confirmed and displayed in reverse on the display screen. The image data in the face image cutting area are designated in the image buffer memory 12-1.

Figure 9:
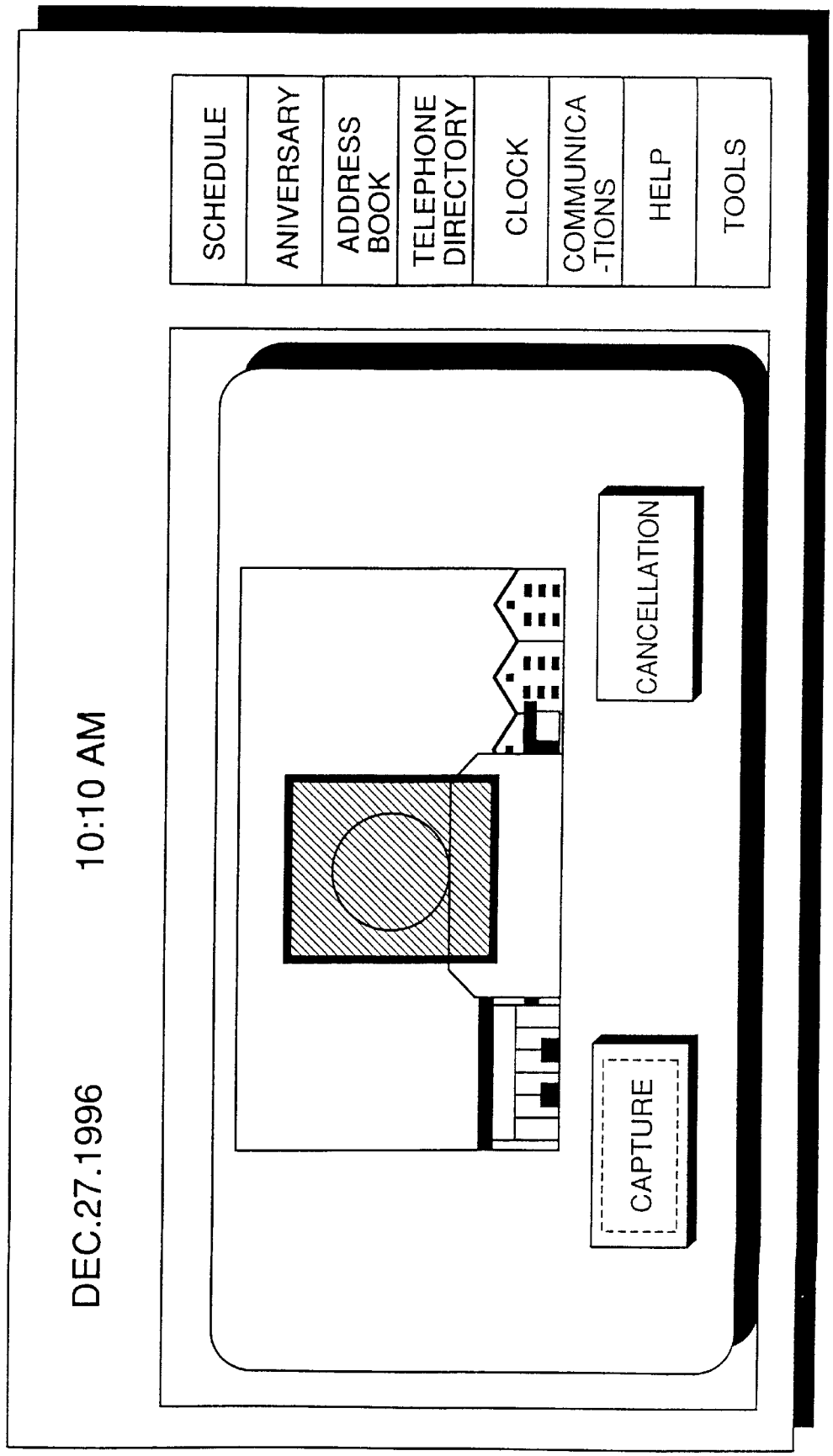
FIG. 9 is an explanatory diagram illustrating a display screen for a cut-out area confirming operation according to the embodiment.

FIG. 9 is an explanatory diagram illustrating a display screen for a cut-out area confirming operation according to this embodiment.

Step S17: When the user touches any of the buttons on the display screen with the pen after checking the cut-out area confirming operation screen shown in FIG. 9, interruption is accepted by the transparent tablet 2-2.

Step S18: Coordinates indicative of the position of a portion of the transparent tablet 2-2 touched with the pen are read into the input controlling section 4-1.

Step S19: The coordinates read in Step S18 are checked and, if the coordinates correspond to the position of a "CAPTURE" button (indicated by a dashed line in FIG. 9), the face image cutting section 11-4 is activated, and the process goes to Step S20. If the coordinates correspond to any other buttons, some other process is performed.

Step S20: The face image cutting section 11-4 extracts image data corresponding to the face image cutting area determined in Step S12 from the image buffer memory 12-1, and the extracted image data are stored in the clip board memory 12-3. The clip board memory 12-3 is an output buffer for storing therein the extracted image data. Since the clip board memory 12-3 can accept image data from another application so as to produce composite image data, the image data from the application can be pasted on the extracted face image data on the clip board. The user can output the composite image data on the color liquid crystal display section or on a color printer as required.

Step S21: If the coordinates read in Step S07 correspond to the position of a "RECOGNITION COLOR CHANGE" button (indicated by a dashed line in FIG. 12), the process goes to Step S22. If the coordinates correspond to any other buttons, some other process is performed.

Figure 13:
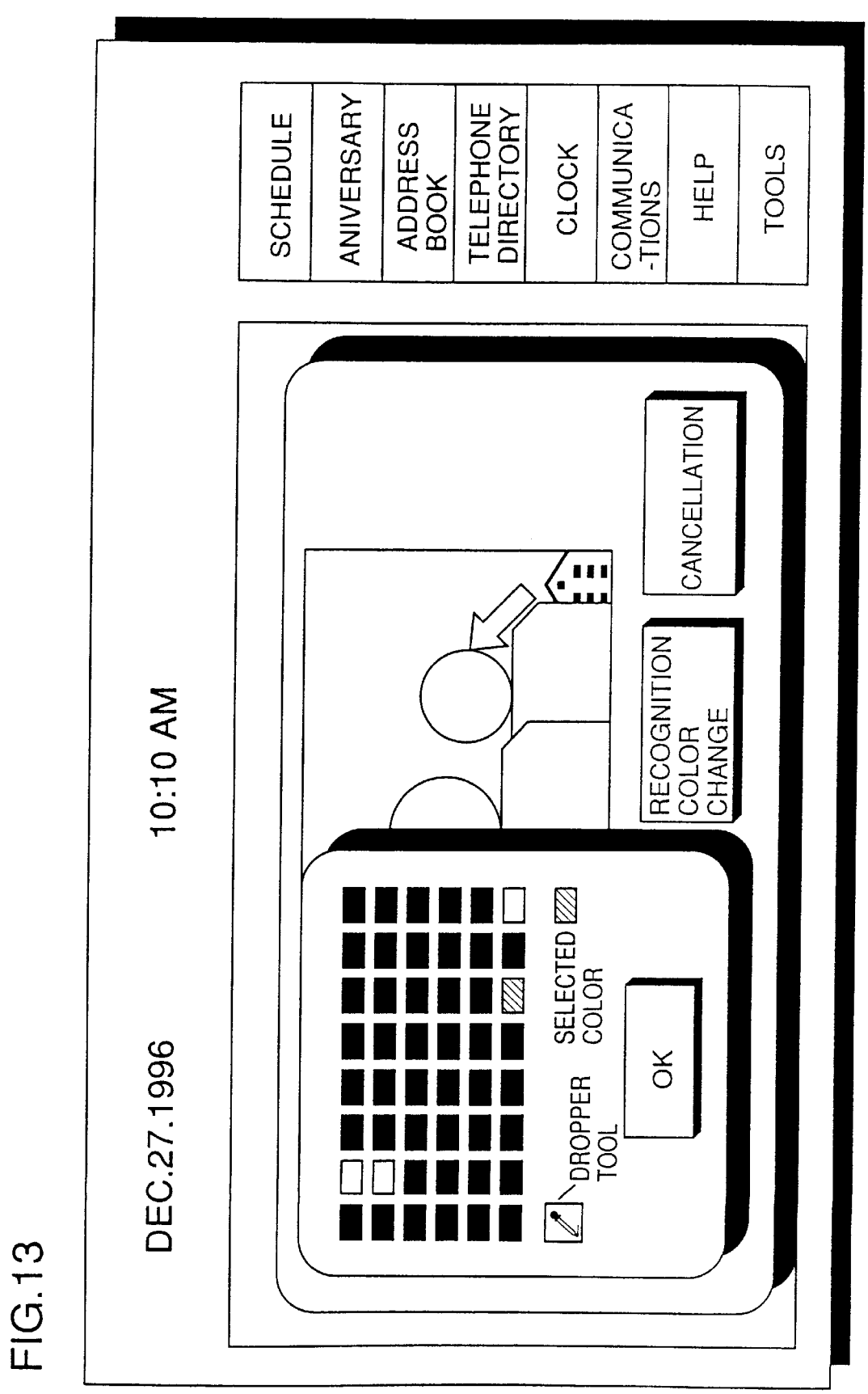
FIG. 13 is an explanatory diagram illustrating a display screen for a face recognition color changing operation according to the embodiment.

Step S22: The recognition color changing section 11-5 displays a color palette as shown in FIG. 13, and performs a recognition color changing operation. Upon completion of Step S22, the process returns to Step S05.

Figure 12:
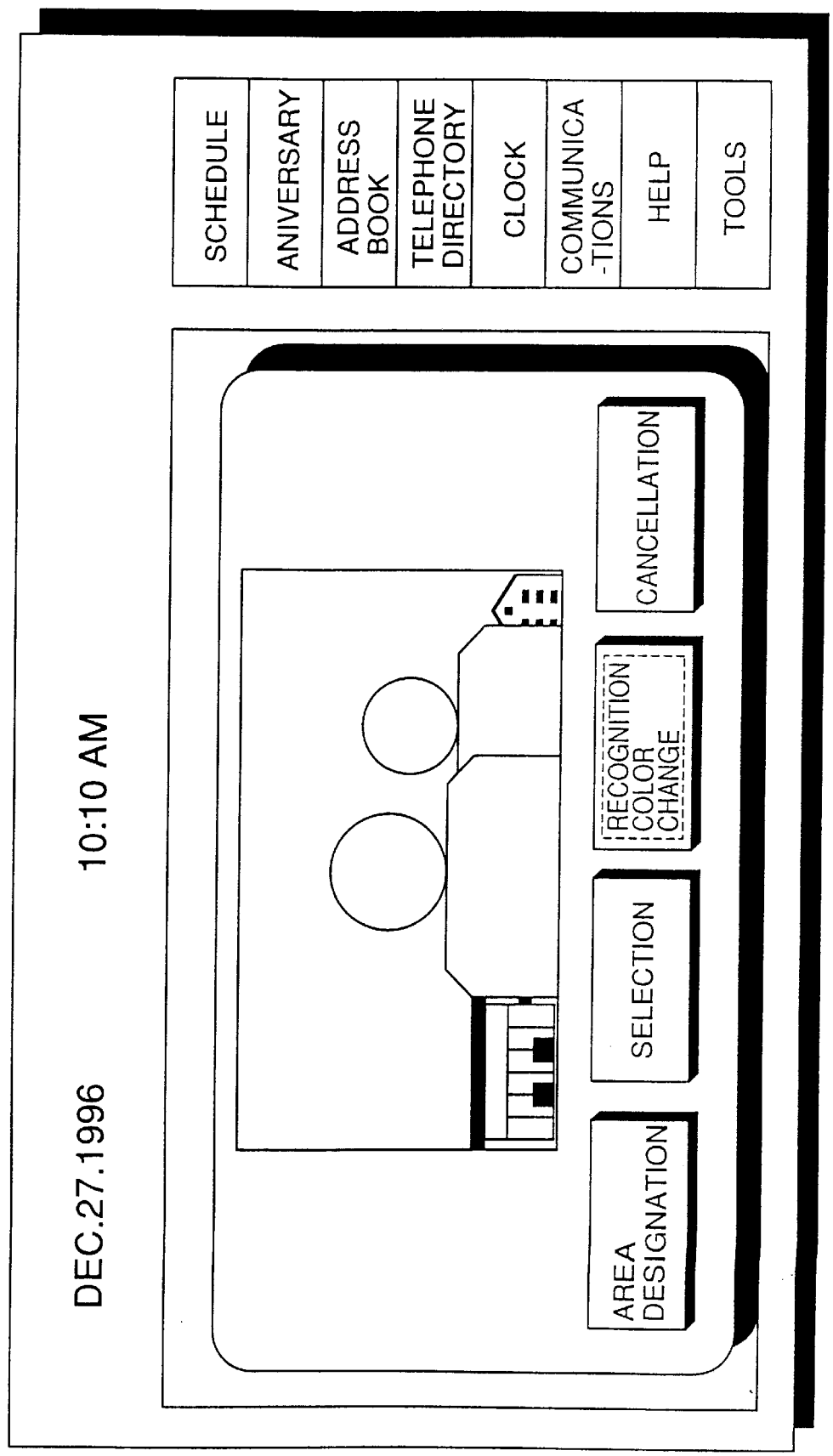
FIG. 12 is an explanatory diagram illustrating a display screen for a recognition color designating operation according to the embodiment.

FIG. 12 is an explanatory diagram illustrating a display screen for a face recognition color designating operation according to this embodiment. When the user touches the "RECOGNITION COLOR CHANGE" button on the display screen shown in FIG. 12 with the pen, the display screen for the face recognition color changing operation is displayed as shown in FIG. 13.

FIG. 13 is an explanatory diagram illustrating a display screen for the face recognition color changing operation according to this embodiment. The user can freely change the designation of the recognition colors by operating the color palette which is displayed as shown in FIG. 13 when the user touches the "RECOGNITION COLOR CHANGE" button with the pen.

At this time, face recognition colors currently designated in the recognition color memory 12-2 are displayed distinctively by enclosing the designated face recognition colors in frames. When the user selects an additional face recognition color by touching any of color options in the palette with the pen, the selected face recognition color is additionally stored in the recognition color memory 12-2.

On the other hand, when the user touches any of the recognition colors which are enclosed in the frames in the color palette to indicate that the colors are currently designated, the touched recognition color is deleted from the recognition color memory 12-2.

Besides the color selecting method using the color palette, the recognition color can be designated by directly selecting the color of the face image (as indicated by an arrow in FIG. 13) by means of a dropper tool.

Thus, the human object image can readily be picked up from the digital photograph or the like without any influences of the brightness of the photographing site and the face skin color which may differ from person to person.

Step S23: If the coordinates read in Step S11 correspond to the position of the "RECOGNITION COLOR CHANGE" button (indicated by a dashed line in FIG. 12) the process goes to Step S24. If the coordinates correspond to any other buttons, the process goes to Step S25.

Step S24: The recognition color changing section 11-5 performs the recognition color changing operation. Upon completion of the recognition color changing operation, the process returns to Step S09. Since the operation in Step S24 is the same as the operation in Step 22, no explanation will be given thereto.

Step S25: If the coordinates read in Step S23 correspond to the position of a "SELECTION" button, the process goes to Step S26. If the coordinates correspond to any other buttons, some other process is performed.

Step S26: The face image selecting section 11-2 performs a face image selecting operation. Upon completion of Step S26, the process returns to Step S09.

Figure 10:
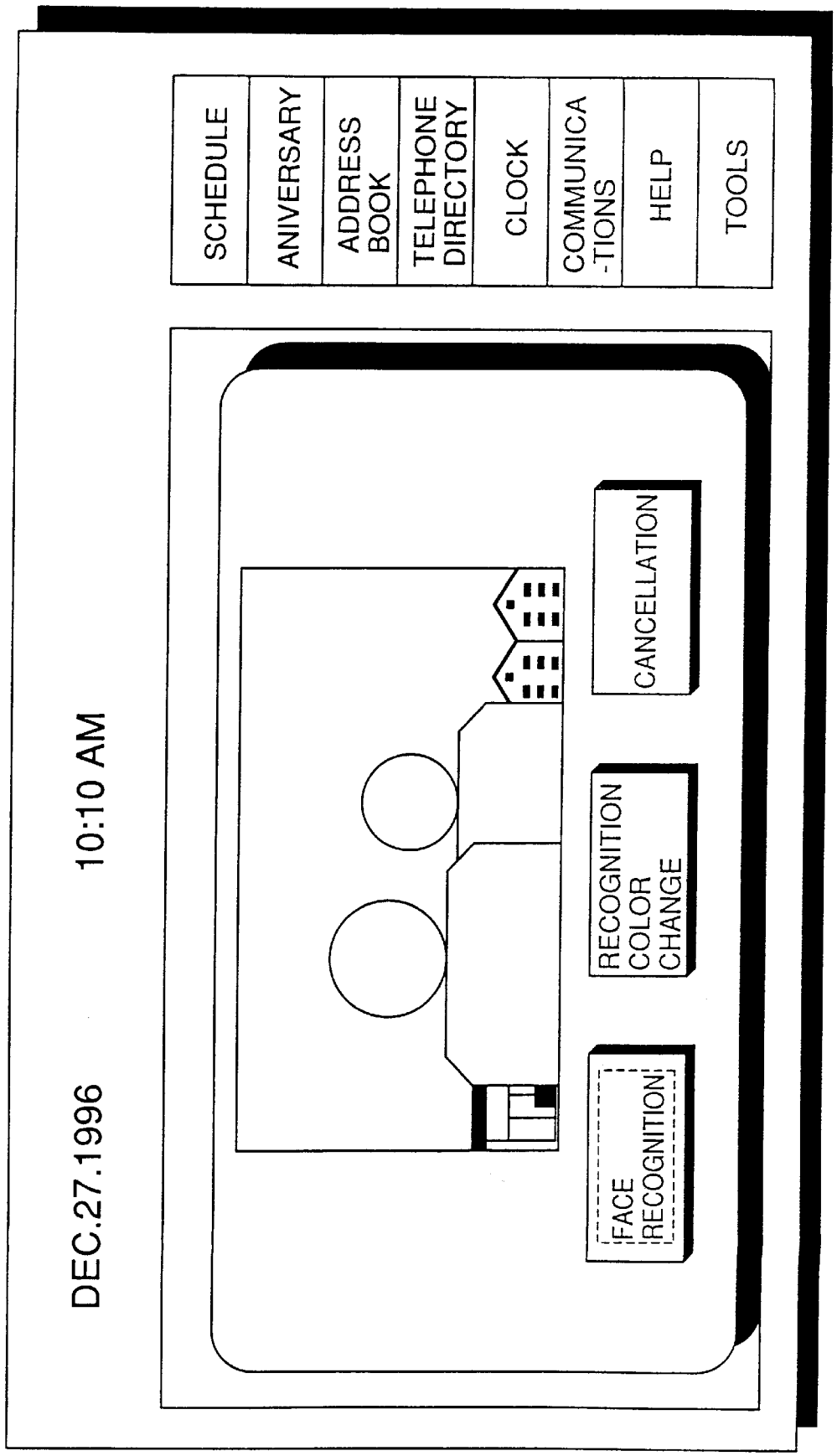
FIG. 10 is an explanatory diagram illustrating a display screen for a plural human object image acquiring operation according to the embodiment.

FIG. 10 is an explanatory diagram illustrating a display screen for a plural human object image acquiring operation according to this embodiment. As shown in FIG. 10, the picked-up image contains two human objects.

In this case, a plurality of face images are recognized and the areas of the recognized face image areas are each calculated and stored in the recognition result memory 12-5. In the case of a single human object, the picked-up image contains only one face image which is definitely recognized (see FIGS. 6 and 7).

The face image selecting section 11-2 selects the largest one of the plural face image areas thus recognized on the basis of the calculated areas and coordinates of the face image areas stored in the recognition result memory 12-5.

Figure 11:
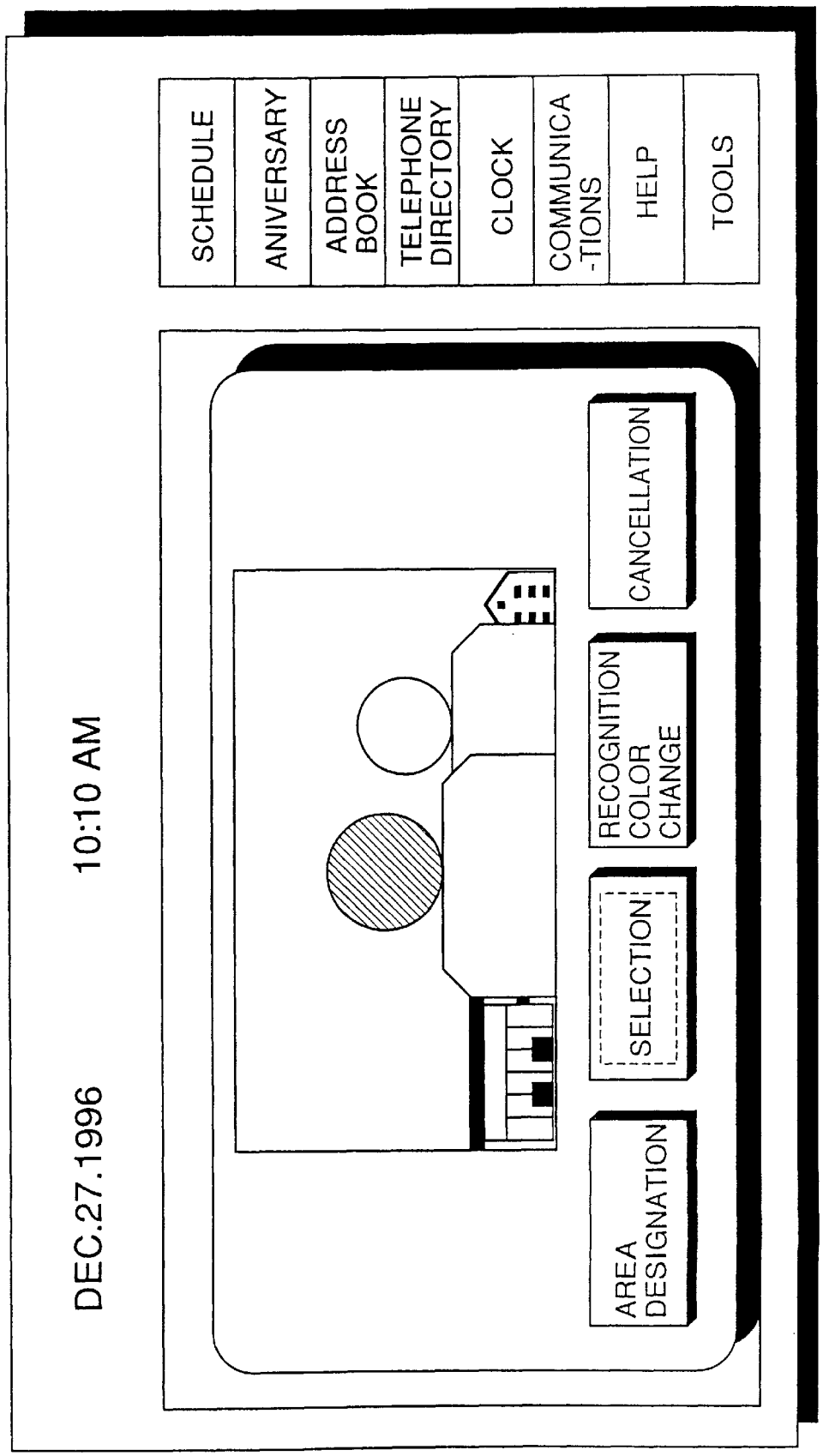
FIG. 11 is an explanatory diagram illustrating a display screen for a plural face recognizing operation according to the embodiment.

FIG. 11 is an explanatory diagram illustrating a display screen for a plural face recognizing operation according to this embodiment. As shown in FIG. 11, the larger one of the recognized face image areas of the two human objects is selected and displayed in reverse on the display screen.

When the "AREA DESIGNATION" button is touched with the pen, the process returns to Step S11 for the area designating operation, whereby a frame defining a face image cutting area is displayed and the face image cutting area is displayed in reverse on the display screen.

Figure 14:
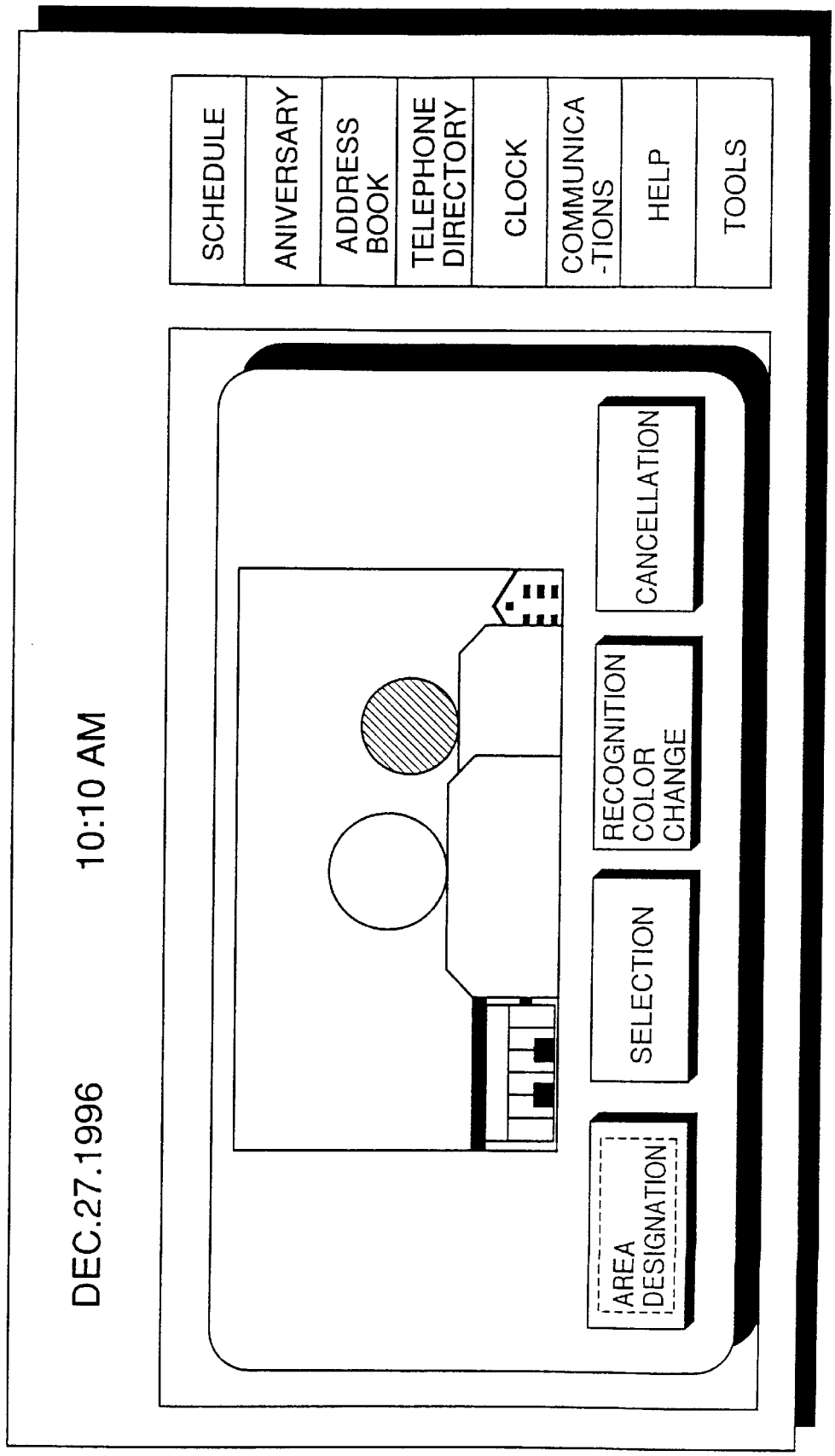
FIG. 14 is an explanatory diagram illustrating a display screen for a face image selecting operation according to the embodiment.

FIG. 14 is an explanatory diagram illustrating a display screen for a face image selecting operation according to this embodiment. When the "SELECTION" button is touched with the pen, the face image selecting section 11-2 detects a face image having the second largest area, which is displayed in reverse on the display screen as shown in FIG. 14.

Figure 15:
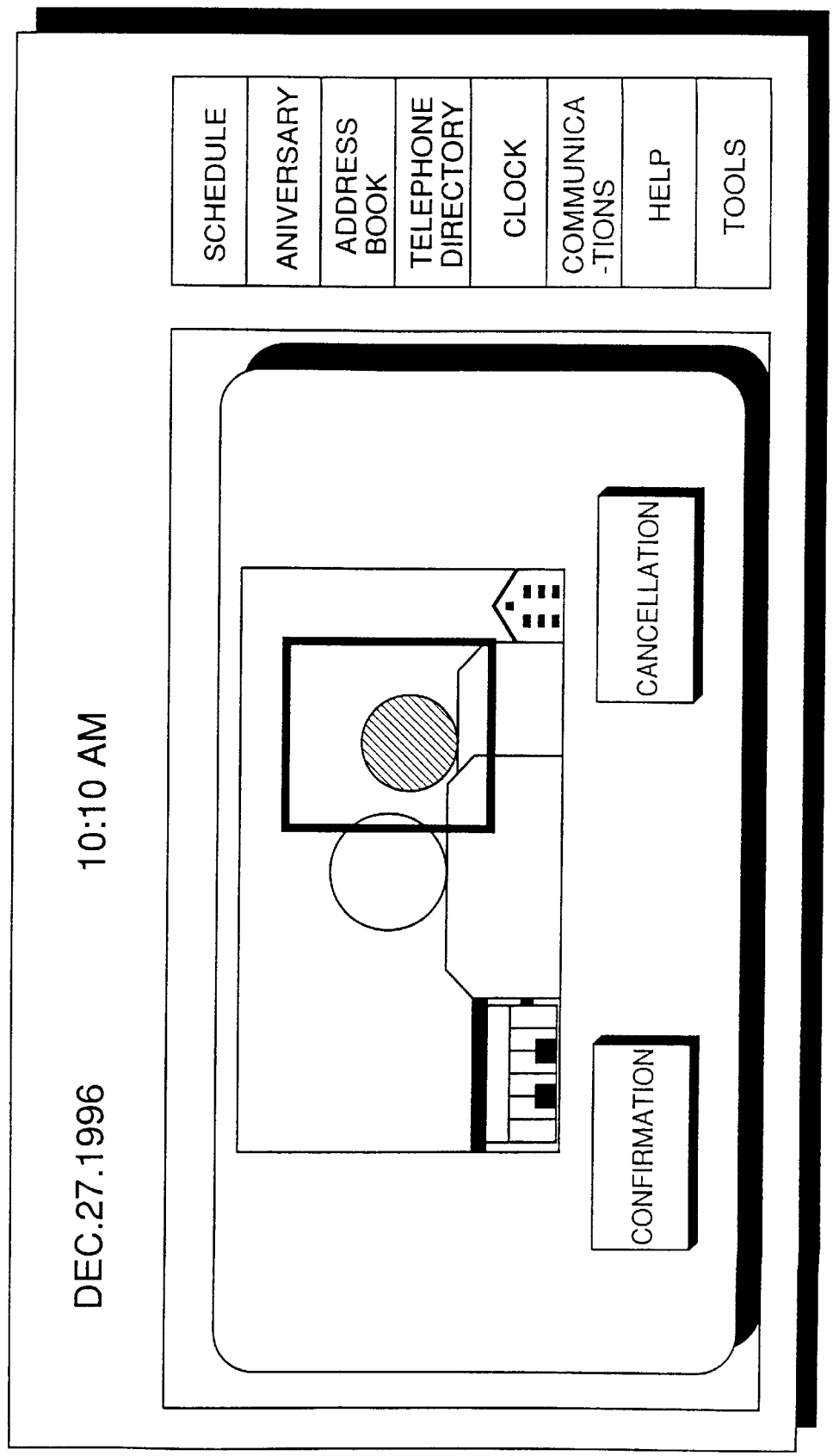
FIG. 15 is an explanatory diagram illustrating a display screen for a pickup area designating operation to be performed after the face image selecting operation shown in FIG. 14.

FIG. 15 is an explanatory diagram illustrating a display screen for a pickup area designating operation to be performed after the face image selecting operation shown in FIG. 14. As shown in FIG. 15, the frame defining the face image cutting area is designated and displayed on the display screen.

Figure 17:
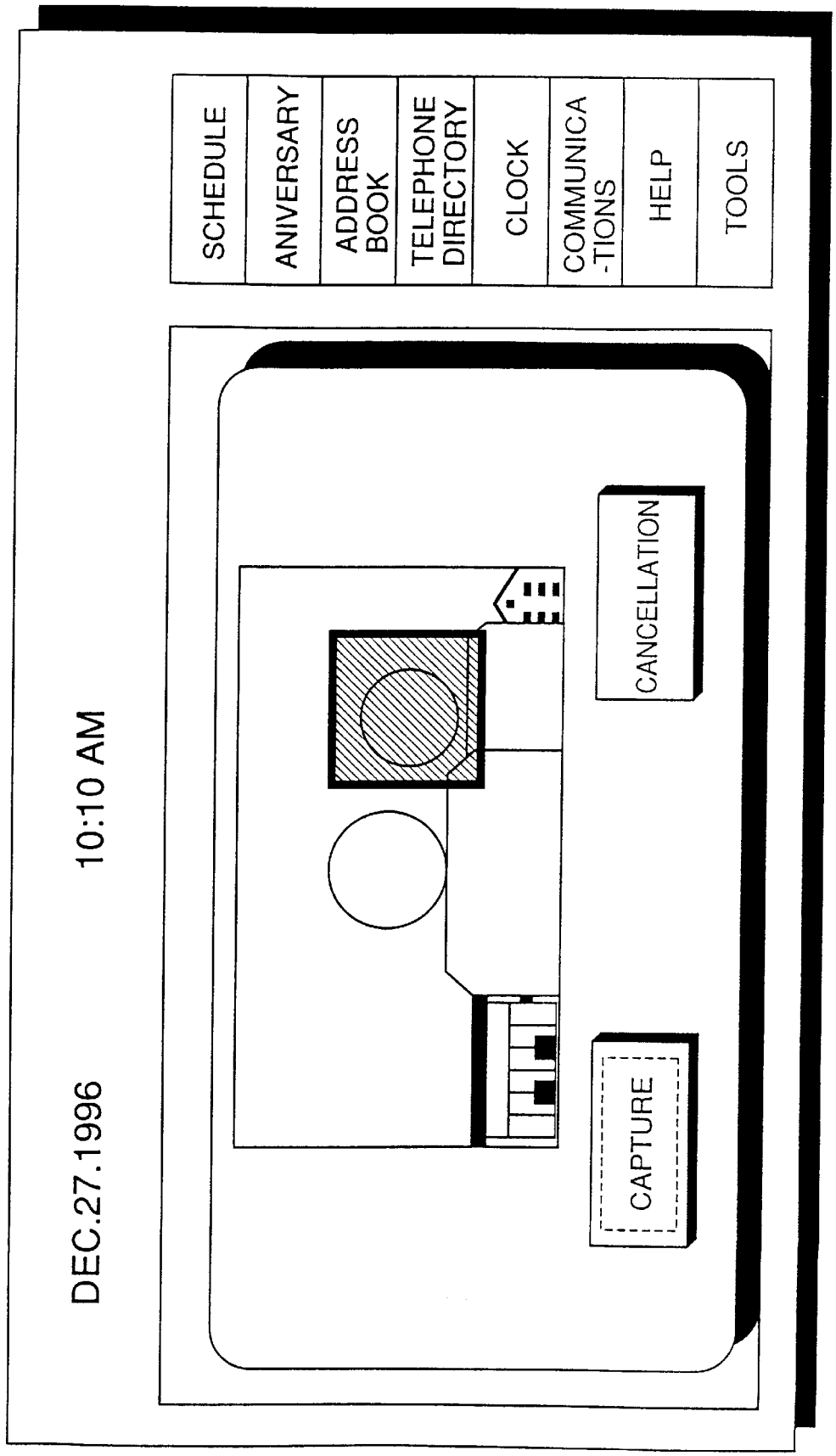
FIG. 17 is an explanatory diagram illustrating a display screen for a cut-out area confirming operation to be performed after the face image selecting operation shown in FIG. 14.

FIG. 17 is an explanatory diagram illustrating a display screen for a cut-out area confirming operation to be performed after the face image selecting operation shown in FIG. 14. As shown in FIG. 17, the confirmed face image cutting area is displayed in reverse on the display screen. Image data in the confirmed face image cutting area are extracted from the image buffer memory 12-1 and stored in the clip board memory 12-3.

Even if three or more human objects are contained in a photographic image, face images of the human objects can successively be selected by repeatedly operating the "SELECTION" button, so that the user can cut out any desired face images.

A "CANCELLATION" button in FIGS. 6 to 17 is used to cancel a currently performed image processing operation to perform a different operation.

In the image processing described above, a face image of a human object contained in an acquired photographic image is automatically recognized; a face image area is automatically designated in accordance with the size of the face image; and image data in the designated face image area are extracted. Therefore, the face image pickup operation can be facilitated. In addition, the face image can properly be picked up without missing of any portion of the face image which may otherwise occur due to shakes during a manual image cut-out operation.

Further, the image processing can select a face image of a particular human object from a plurality of human objects in image data, then automatically designate a face image pickup area in accordance with the size of the face image, and extract image data in the designated face image pickup area.

The image processing according to the present invention can be used, for example, along with the following applications:

Address Book Application

A face image of a person picked up through the image processing can be registered along with his or her name in an address book. This makes it easy to recall the name of the person when a user remembers his face but cannot remember his name.

Further, when a face image of a person to be registered in the address book is picked up through the image processing, the face image can automatically be extracted from an image picked up by a digital camera. Even if there exist a plurality of persons in a photographing site, the face image of the person of interest can automatically be picked up by allowing the person of interest to stand in front of the other persons, since the image processing is adapted to automatically recognize a human object located closer to the digital camera.

Business Card Application

A face image picked up through the image processing can readily be incorporated in a business card. If a business person hands a business card with his face image to his customer in business card exchange, the customer easily remembers his name as well as his face.

Customer Data Base Application

Face images of staff members of corporate customers picked up through the image processing can be registered along with the names of the staff members and the businesses of the corporate customers in a customer data base. Therefore, even if a business person hands over his business duties to his successor, the successor can readily identify the staff members of the corporate customers by searching the data base.

In accordance with the present invention, a face image of a human object can readily be picked up by acquiring color image data including a human object image from a digital image currently being picked up or an image in a finished photograph without any influences of the background or brightness of the image, then automatically recognizing a face image of the human object image in the color image data, and cutting out an area including the recognized face image in accordance with the size of the face image.

What is claimed is:

1. An image processing apparatus for recognizing a face image area comprising:
    a display for displaying a color image which includes a human object image;
    a recognition color memory changeably storing face recognition color data in advance for recognizing a face image area of the human object image;
    a recognition designating section for designating implementation of a face image area recognizing operation;
    a face image area recognizing section for comparing color data in the color image with the face recognition color data to automatically recognize a plurality of face image areas based on color data of the color image conforming to any of the face recognition color data;
    an area designating section for designating one of the plurality of recognized face image areas as a designated face image area;
    a frame forming section for forming a frame so that the frame proportionally embraces the designated face image area; and
    a face image area cutting section for cutting out an area enclosed in the frame.

2. An image processing apparatus according to claim 1 wherein, when the color image color data conforms to any of the face recognition color data, the face image area recognizing section extracts an area having the greatest size from the plurality of recognized areas as the face image area.

3. An image processing apparatus according to claim 1, further comprising a color changing section for changing the face recognition color data stored as face recognition colors in the recognition color memory when the face recognition color data is displayed on the display, and for outputting the changed face recognition color data to the face image area recognizing section.

4. An image processing apparatus according to claim 3, wherein the face image area recognizing section compares color data within the color image with face recognition color data changed by the recognition color changing section, and recognizes an area having color data conforming to any of the changed face recognition color data as a face image area.

5. An image processing apparatus according to claim 1 wherein the area designating section outputs changes in the position and size of the formed frame to the frame forming section, wherein the frame forming section reforms the frame based on these changes.

6. An image processing apparatus according to claim 1 wherein the face image area recognizing section displays the recognized face image area on the display in reverse on a complementary color basis.

7. An image forming apparatus according to claim 1, wherein the function of the area designating section is displayed as an icon on the display.

8. A storage medium containing thereon a computer program for controlling an image processing apparatus having a display section, a recognition color memory changeably storing face recognition color data in advance for recognition of a face image of a human object image in a color image, a recognition designating section for designating implementation of a face image area recognizing operation, and a frame designating section for designating a face image pickup area for a recognized face image,
    the computer program performing the functions of:
        causing a computer operation to display a color image which includes a human object on a display;
        causing a computer operation to compare color data in the image with said face recognition color data changeably stored in advance to automatically recognize a plurality of face image areas based on color data of the color image conforming to any of the face recognition color data, wherein one the plurality of face image areas is a designated face image area;
        causing a computer operation to form a frame around the designated face image so that the frame proportionally embraces the designated face image area; and
        causing a computer operation to cut out the face image area enclosed within the frame.

9. A storage medium according to claim 8, wherein said computer program further performs the functions of causing a computer to change the face recognition color data stored as face recognition colors in the recognition color memory when the face recognition color data is displayed on the display, and causing the computer to output the changed face recognition color data to the face image area recognizing section.

10. A method for controlling an image processor, comprising:
    displaying a color image having a plurality of human objects on a display;
    comparing color data of the color image with face recognition color data changeably stored in advance for recognizing a face image area on the display;
    automatically recognizing an area in the color image where its color data conforms to the face recognition color as a designated face image area in a face image area recognizing section, the designated face image area being from one of the plurality of human objects;
    framing the designated face image area in a frame on the display, wherein the frame size and designated face image area are adjustable on the display so that the frame proportionately embraces the designated face image area; and
    cutting out the face image area on the display.

11. The method according to claim 10, further including:
    updating the face recognition color data when it is displayed; and
    outputting the updated face recognition color data to the face image area recognizing section.

12. An image processor, comprising:
    a display for displaying a color image which includes at least a human object;

a face image area recognizing section for comparing color data of the color image with face recognition color data changeably stored in advance on the display, wherein the face image area recognizing section automatically recognizes an area containing color data which conforms to the pre-stored face recognition color data, the recognized area being selected as a face image area; and a face image area cutting section for cutting out a face image from the selected face image area within a frame on the display so that the frame proportionately embraces the designated face image area prior to cutting out the face image.

13. An image processor according to claim 12, wherein the face image area recognizing section extracts an area having the greatest size from the recognized area as the selected face image area.

14. An image processor according to claim 12, further including a recognition color changing section for updating the face recognition color data when it is displayed, and for outputting the updated face recognition color data to the face image area recognizing section.

15. An image processor according to claim 14, wherein the face image area recognizing section compares color data with the updated face recognition color data and automatically recognizes an area containing color data which conforms to the updated face recognition color data, the recognized area being selected as a face image area.

16. An image processor according to claim 12, further including:

a recognition designating section for designating implementation of the face image area recognizing section; and an area designation section for selecting the recognized area as the face image area, wherein functions of the recognition designating and area designation sections are displayed as icons on the display.

17. An image processor according to claim 12, wherein the face image area recognizing section displays the recognized area in reverse on a complementary color basis upon the display.

18. An image processor, comprising:

a display for displaying an acquired color image which includes at least a human object image;

a memory changeably storing face recognition color data in advance for recognizing a face image of the human object image;

a face image area recognizing section for comparing color data of the color image with the pre-stored face recognition color data on the display, wherein the face image area recognizing section automatically recognizes an area containing color data which conforms to the face recognition color data, the recognized area being selected as a face image area;

a color changing section for updating the face recognition color data when the stored face recognition color data is displayed for selection, wherein when the face recognition color data is updated, it is output to the face image area recognizing section for comparison with the color data, automatic recognition, and subsequent selection as the face image area; and a face image area cutting section for cutting out a face image from the selected face image area within a frame on the display so that the frame proportionately embraces the designated face image prior to cutting out the face image.

19. An image processor according to claim 18, further including:

a recognition designating section for designating implementation of the face image recognizing section; and an area designation section for selecting the recognized area as the face image area, wherein functions of the recognition designating and area designation sections are displayed as icons on the display.

20. An image processor according to claim 18, wherein the recognizing section displays the recognized area in reverse on a complementary color basis.

21. An image processor according to claim 18, wherein functions for the face image area recognizing, color image changing and face image area cutting sections are initiated by touching the display screen with a pen or finger.

22. An image processing apparatus for recognizing a face image area comprising:

a display for displaying a color image which includes a human object image;

a recognition color memory changeably storing face recognition color data in advance for recognizing a face image area of the human object image;

a recognition designating section for designating implementation of a face image area recognizing operation;

a face image area recognizing section for comparing color data in the color image with the face recognition color data to automatically recognize a plurality of face image areas based on color data of the color image conforming to any of the face recognition color data;

a color changing section for changing the face recognition color data stored as face recognition colors in the recognition color memory when the face recognition color data is displayed on the display, and for outputting the changed face recognition color data to the face image area recognizing section;

an area designating section for designating one of the plurality of recognized face image areas as a designated face image area;

a frame forming section for forming a frame so that the frame proportionally embraces the designated face image area; and a face image area cutting section for cutting out an area enclosed in the frame.

* * * * *